(12) United States Patent
Callen

(10) Patent No.: US 8,817,976 B2
(45) Date of Patent: Aug. 26, 2014

(54) REVERSIBLE CIPHER

(76) Inventor: Gregory Scott Callen, Anaheim, CA (US)

(*) Notice: Subject to any disclaimer, the term of this patent is extended or adjusted under 35 U.S.C. 154(b) by 395 days.

(21) Appl. No.: 13/168,679

(22) Filed: Jun. 24, 2011

(65) Prior Publication Data

US 2012/0328091 A1 Dec. 27, 2012

(51) Int. Cl.
*H04K 1/00* (2006.01)
*H04L 9/06* (2006.01)
*H04L 9/08* (2006.01)

(52) U.S. Cl.
CPC ............ *H04L 9/0662* (2013.01); *H04L 9/0861* (2013.01)
USPC ........................................................ 380/28

(58) Field of Classification Search
CPC .... G06F 21/606; H04L 9/0662; H04L 9/0861
USPC ........................................................ 380/28
See application file for complete search history.

(56) References Cited

U.S. PATENT DOCUMENTS

2001/0050989 A1* 12/2001 Zakiya ............................ 380/29
2008/0263363 A1* 10/2008 Jueneman et al. ............. 713/184
2011/0264922 A1* 10/2011 Beaumont et al. ............ 713/189

OTHER PUBLICATIONS

Yue Wu. "Image Encryption using the Sudoku matrix." Pub. Date. Apr. 2010, pp. 1-13 http://proceedings.spiedigitallibrary.org/proceeding.aspx?articleid=745016.*
Moses Liskov, Ronald L. Rivest, and David Wagner, Tweakable Block Ciphers, Journal of Cryptology, Jun. 2011, pp. 588-613, 24-3, US.
Dr. Mostafa Hassan Dahshan, CEN 448 Security and Internet Protocols, Chapter 3 Block Ciphers and DES, King Saud University presentation, Nov. 2, 2008, pp. 1-22, SA.
Yuan Xue, Block Cipher Principle, Lecture 7, Sep. 15, 2006.
Marcin Seredynski and Pascal Bouvry, Block Cipher based on Reversible Cellular Automata, Journal: New Generation Computing-Evolutionary computation, Sep. 2005, 23-3, JP.

* cited by examiner

*Primary Examiner* — Krista Zele
*Assistant Examiner* — James Forman
(74) *Attorney, Agent, or Firm* — Rutan & Tucker LLP; Hani Z. Sayed

(57) ABSTRACT

A cipher device having a number of data bits in an input register corresponding to a data unit element, a sudoku filter coupled with the input register, and a data selector coupled with the sudoku filter and the input register. A fob cipher device has a FPGA programmed to perform encrypting of a plaintext with a transposed Sudoku to form a first ciphertext and encrypting the first ciphertext with pseudorandom mixing bits to form a second ciphertext. A reversible encryption method includes encrypting plaintext with a transposed Sudoku forming a first ciphertext, encrypting the first ciphertext with pseudorandom mixing bits forming a second ciphertext, and outputting the plaintext-corresponding second ciphertext.

10 Claims, 8 Drawing Sheets

```
// Cipher File
// Copyright © 2011 by Gregory Scott Callen
// All Rights Reserved.

import java.io.*;

class CipherFile {
    public static void main(String args[])
            throws IOException {
        int myByte = 0;
        DataInputStream dataIn;
        DataOutputStream dataOut;
        if(args.length!=3){
            System.out.println("\njava CipherFile inputFile outputFile password");
            return;
        }
        try {
            dataIn = new DataInputStream(new FileInputStream(args[0]));
        } catch (IOException exc) {
            System.out.println("Cannot open input file.");
            return;
        }
        try {
            dataOut = new DataOutputStream(new FileOutputStream(args[1]));
        } catch (IOException exc) {
            System.out.println("Cannot open output file.");
            return;
        }
        KRYPTOP kryptop=new kryptop(args[2]);
        try {
            do {
                myByte = dataIn.readByte( );
                dataOut.writeByte( myByte^kryptop.cipher(8) );
            } while(true);
        } catch(EOFException eof) {
            System.out.println("KRYPTOP enciphered successfully!");
        } catch(IOException exc) {
            System.out.println("File not enciphered.   "+exc);
        }
        dataIn.close();
        dataOut.close();
```

FIG. 3

```
public class KRYPTOP{
    int bits=41, psdko=13;
    int sdko[]={8,14,1,8,13,2,4,1,6,7,2,4,9,11,13,6,7,14,9,11};
    public KRYPTOP(String qPassword){
        char[] pw=qPassword.toCharArray();
        int len=pw.length;
        int l=0,c=0,i=0,t=0,k=0;
        int mode=0;
        while(true){
            if((c<20)&&(l<len)){ c+=pw[l]; l++; }
            switch(mode){
                case 0:  bits=c&63;   c»=6; mode++; break;
                case 1:  psdko=c%20;  c/=20; mode++; break;
                default: k=c%20;
                         t=sdko[i];
                         sdko[i]=sdko[k];
                         sdko[k]=t;
                         c/=20;
                         i=(i+1)%20;
                         break;
            }
            if((c<=0)&&(l>=len))return;
        }
    }
```

FIG. 5

```
public int cipher(int q){
    int r=0, i, px, py, tx;
    if(q<1)q=1;
    if(q>32)q=32;
    for(i=0;i<q;i++){
        psdko=(psdko+7)%20; px=(bits*5)»4;
        tx=sdko[px]; sdko[px]=sdko[psdko]; sdko[psdko]=tx;
        switch (sdko[psdko]) {
            case 1:bits+=31; break;
            case 2:bits-=22; break;
            case 4:bits-=27; break;
            case 6:bits-=10; break;
            case 7:bits+=13; break;
            case 8:bits+= 2; break;
            case  9:bits-=17; break;
            case 11:bits-= 8; break;
            case 13:bits+= 9; break;
            case 14:bits+=12; break;
            default: System.out.println("error sdko[psdko]="+sdko[psdko]); break;
        }
        bits&=63;
        r=(r«1)|(sdko[((bits»2)+psdko)%20]»(bits&3))&1;
    }
        return r;

REVERSIBLE CIPHER

BACKGROUND OF THE INVENTION

1. Field of the Invention

The present invention relates to ciphering apparatus and methods and, in particular, stream-type block cipher apparatus and methods.

2. Background Art

The Internet has become a powerful public communication and information tool. Even so, secure communication between peer computing nodes (peer-to-peer communication) has become vulnerable to attack by the nefarious and by privacy-loathing governments around the world. Secure peer-to-peer communications on the Internet enhances the networks' utility as a means of commerce. However, a wide-used form of security—Public Key Encryption, including RSA—is vulnerable to mathematical attacks. Another form, DES is no longer considered to provide enough security for secure transactions. Yet another, RC4, is expensive in that it requires a large amount of memory and setup time. Almost all current ciphers require manual human intervention to work; it is highly desirable to have well-distributed random number generators to provide for secure keys, and humans are notoriously bad at generating lengthy random numbers and at recalling, long, truly random passwords. Ciphering apparatus and methods avoiding these shortcomings are desirable.

SUMMARY

The present invention includes methods and apparatus for stream-type block ciphering. A method of securing data, includes receiving a plaintext data unit; encrypting a plaintext data unit with a transposed Sudoku to form a first ciphertext unit; encrypting the first ciphertext unit with pseudorandom mixing bits to form a second ciphertext unit; and outputting the second ciphertext unit corresponding to the plaintext data unit. Another method, for deciphering, includes receiving a third ciphertext data unit; encrypting the third ciphertext data unit with a transposed Sudoku to form a fourth ciphertext unit; encrypting the fourth ciphertext unit with pseudorandom mixing bits to form a second plaintext data unit; and outputting the second plaintext data unit corresponding to the third ciphertext unit.

An apparatus for securing data includes an input register having a predetermined number of data bits corresponding to a data unit element; a sudoku filter coupled with the input register having a predetermined number of elements corresponding to the predetermined number of data bits; and a data selector coupled with the sudoku filter and the input register. Another apparatus, in a fob configuration, includes: an input port, a FPGA coupled with the input port, and configured using an HDL to perform encrypting a plaintext data unit with a transposed Sudoku to form a first ciphertext unit and encrypting the first ciphertext unit with pseudorandom mixing bits to form a second ciphertext unit; and an output port coupled with the FPGA. The FPGA, the input port, and the output port are configured as a FOB device; and the plaintext is received at an input port and a corresponding second ciphertext unit is transmitted to the output port. In certain embodiments, a memory device coupled with the FPGA. In others, the input and output ports are USB ports.

BRIEF DESCRIPTION OF DRAWINGS

The invention is generally shown by way of reference to the accompanying drawings in which:

FIG. 3 is an example JAVA® programming code representation of the first program algorithm, in accordance with the teachings of the invention herein;

FIG. 5 is an example JAVA® programming code representation of the second program algorithm, in accordance with the teachings of the invention herein;

FIG. 7 is an example JAVA® programming code representation of the third program algorithm, in accordance with the teachings of the invention herein.

In the figures, which are not drawn to scale, like numerals refer to like features throughout the description.

DETAILED DESCRIPTION OF EMBODIMENTS

The cipher method and apparatus herein provide a reversible element-oriented (stream-type) block cipher and cipher device that can be easily implemented in hardware or software. Without limitation, the hardware can include firmware or hardware description languages, and the software can include one or more of compiled, scripting or server-side programming languages. Hardware description languages can include Verilog® HDL language, SystemVerilog language, VHDL language, and SystemC language. Compiled languages can include platform-independent JAVA® or Python programming language, or conventionally compiled code such as C++®, C®, Objective C, FORTRAN, Pascal, or BASIC programming languages. Scripting languages also may be used, such as interpreted BASIC language, JavaScript®, AppleScript®, ActionScript® or Lingo® programming languages. A server-side language includes perl, PHP, CGI, ASP or JSP server-side language. It is known to those of ordinary skill in the art that a scripting-type language tends to operate more slowly than a hardware, a compiled, or a server-side language. Indeed, a hardware language (HDL) usually is "compiled" into a physical electronic device, which can realize the reversible cipher herein at wire speed. The physical electronic device can be a cipher device included as a lightweight cryptofilter on a playback device that uses the cipher device as part of a media content protection or digital rights management scheme.

This reversible cipher or cipher device can be block-operable on a payload, such as a pixel, a file, or a data stream, although the cipher possesses some stream-mode characteristics. Mutatis mutandi, the reversible cipher or cipher device can be used on a bit payload, as in a stream-based cipher protocol. The reversible cipher or cipher device herein may be used in a modem, in a computer, in a computer tablet, in a medium (video, audio, or A/V) replay device, in a television, in a movie projection apparatus, in a smart phone, in sensitive or proprietary data files, in self-extracting archives, in managed digital right files, and in other applications where reversible ciphers or cipher devices may be used. The reversible cipher or cipher device can use selectable mixing values in a pseudorandom number generator within the cipher operations. The reversible cipher also can be configured to integrate a password, which may be used to encrypt and decrypt the payload at the source and destination, respectively, using a predetermined mixing value set.

Figure 1:
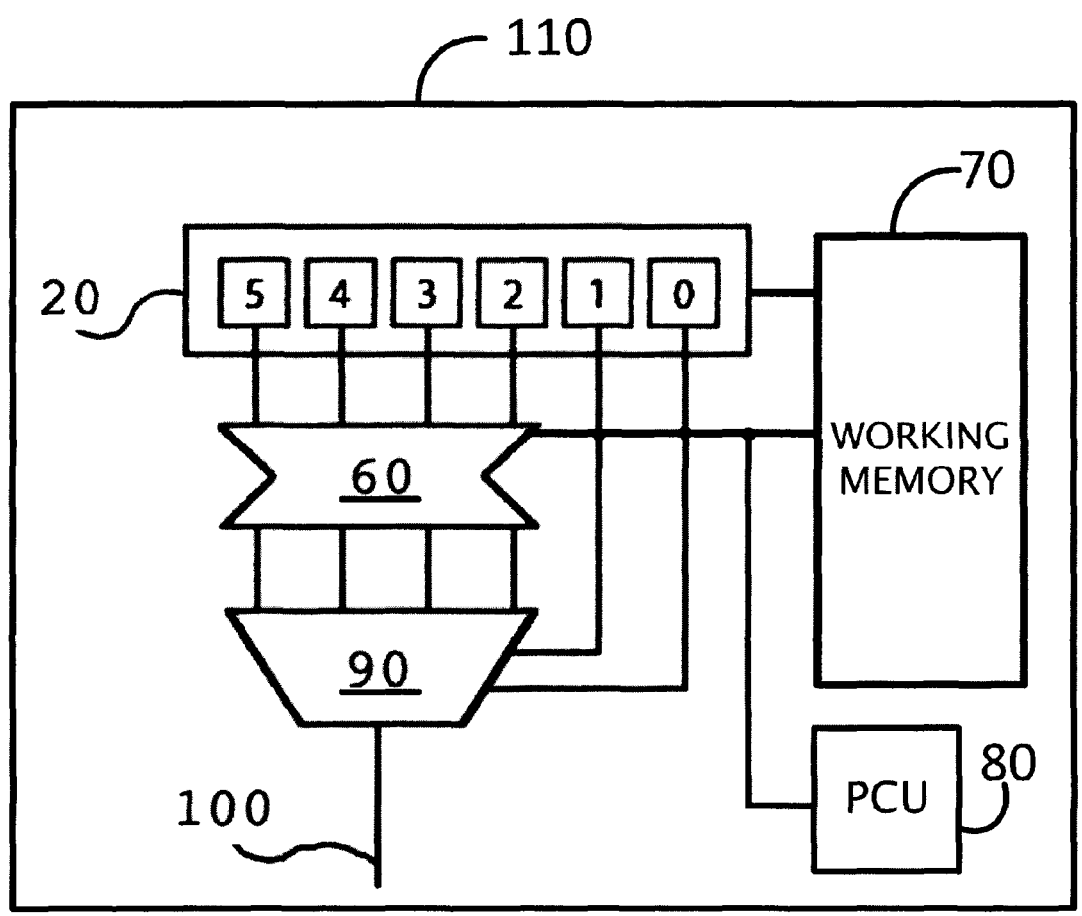
FIG. 1 is a logic block diagram of a cipher device, in accordance with the teachings of the invention herein.

As typified by FIG. 1, the cipher device 110 in accordance with the present embodiments can include an input register or bits list 20, a sudoku (filter) 60 coupled to the input register, and at least one multiplexer (MUX) or data selector 90, from which a cipher value is output, coupled to sudoku 60 and input register 20. Working memory 70 can be used to store intermediate values, variables, and pointers during operations. Device 110 also can include process control unit (PCU) 80 to manipulate instructions and values in respective elements. PCU 80 may be constituted of a FPGA, a CPLD, or a programmed microprocessor or microcontroller. Similarly, FPGA or CPLD also may include memory, registers, a sudoku memory area, a data selector, and hardware to implement the encryption routines herein (such as "KRYPTOP" or "CIPHER"). PCU 80 is operably coupled with input register 20, sudoku 60, MUX 90, and working memory 70. Input register 20 can be configured to include a 1×n grid or array of numbers from a payload, and sudoku device 60 may be configured to contain 1×(n−m) values, where n includes the number of inputs to the at least one MUX 90, and m, a subset of n, can be the number of selector lines. For understanding, (m=2) bits "0" and "1" are shown as being coupled to the MUX, although the m bits may be drawn from any preselected bits of the input register to operate the selection function of the MUX 90. A payload may include a header or footer used to on or off ciphering and may include a password or other encrypted message.

Typically, sudoku is a term used for a logic-based, combinatorial number-placement puzzle which term here is suggestive of the filter or filter list used in the present embodiments. The complementary pairs are chosen so inputs will not be ignored in the data selection stage of this stream cipher. Sudoku 60 can serve to sift bits from register 20. Sudoku 60 can receive 4 bits (16 possibilities) and shuffles or filters these 4 bits into 10 preselected bit combinations. There can be at least six (6) bits in register 20 and 10 complementary hexadecimal pairs in sudoku 60, for a total of 20 numbers. Twenty suitable example hexadecimal values for a sudoku 60 list can be, without limitation, the set of $\{8, 14, 1, 8, 13, 2, 4, 1, 6, 7, 2, 4, 9, 11, 13, 6, 7, 14, 9, 11\}_{16}$. These bit combinations eliminate the 6-of-16 hexadecimal values which may cause inputs to be ignored or can cause a lockup situation. In this example, m is selected to be 2, leaving 4 bits for each sudoku 60 value. In general, the sudoku list 60 can contain selected 1 of 4 bit numbers, as a 10-of-16 filter list. The 6-bit register 20 can be made to assume a unique value between 1 and 63 (1 and $2^6$-1). Preferably, in a four-bit sudoku 60, six complementary values that may cause "don't care" (ignore) states, may be excluded from the 4 bit (HEX) sudoku (filter) list 60, including 0000 (0H), 0011 (3H), 0101 (5H), 1010 (AH), 1100 (CH), and 1111 (FH). Sudoku 60 has 20 elements and because the prime factorization of 20 is 5, 2, and 2, the value of the sudoku element can be multiplied by 5 to bring the 6 bits in input register 20 into parity with the 20 elements in the sudoku array 60. By shifting right four (4) times, i.e., dividing by 16, the appropriate power of 2 is achieved. For example, 63 times 5 equals 315. Dividing 16 into 315 yields 19.6875; because integer mathematics can be used, the final value of 19 may be achieved by dropping the fractional value, or 0.6875. The resulting value of 19 is within sudoku 60 range, that is, 0 to 19, of 20 elements.

Figure 2:
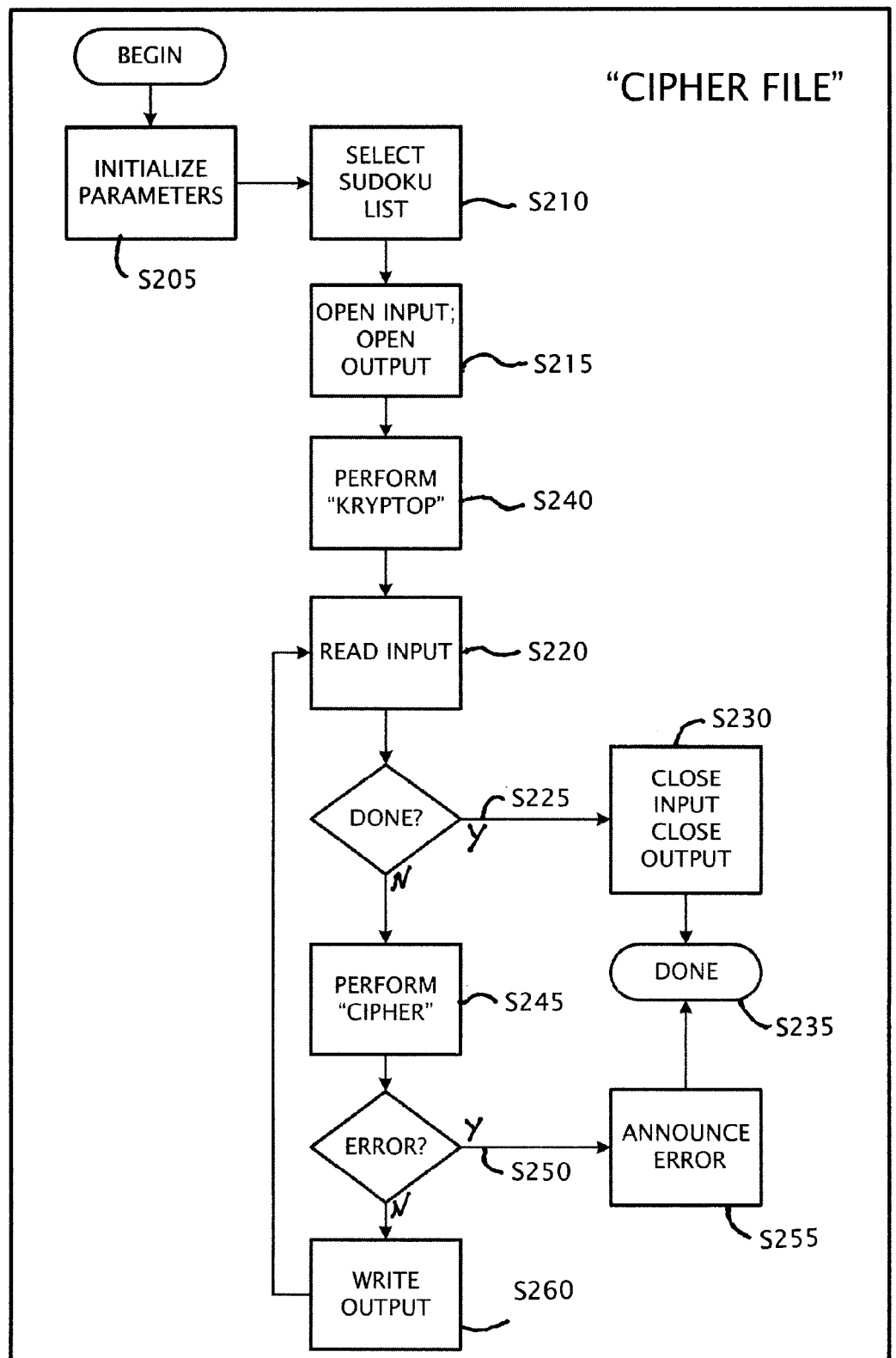
FIG. 2 is a logic flow diagram of a first program algorithm used in accordance with the teachings of the invention herein.

Turning to FIGS. 2 and 3, a general flow diagram of the password-integrating ciphering scheme, for convenience, identified as "CIPHER FILE" is described respectively using a logic flow and the JAVA® programming language for clarity, as may be executing on cipher device 110. "CIPHER FILE" is an example operational program which illustrates the logical flow of the "KRYPTOP" and "CIPHER" suboperations used to reversibly encipher a plaintext message or to decipher an encrypted ciphertext message. Code for one or more of "CIPHER FILE," "KRYPTOP," and "CIPHER" operations may be stored in PCU 80 or in memory 70 allocated to such use. PCU 80 may contain flash memory and may be flash programmable. By executing such stored instructions, for example, as described by flow 200, encryption and decryption may be performed. In a payload, a header or footer may be used to turn on and off ciphering, allowing for simple encryption or decryption of a protected block, file, or data stream.

A typical flow "CIPHER FILE" flow 200 can proceed by initializing parameters (S205), selecting a sudoku list (S210), opening input and output files (S215), and reading an input data unit (S220) (e.g., a password character) for enciphering. If a data unit is not available for enciphering (S225), the method proceeds by closing (S230) input and output files and indicating completion (S235). If an input data unit is available for enciphering, then the method proceeds by performing (S240) the "KRYPTOP" operation upon the input data unit to create a first enciphered data unit integrating, for example, a password datum or element, and by performing (S245) the "CIPHER" pseudorandom operation to apply the pseudorandom mixing values to the first ciphertext data unit, thereby creating a second ciphertext data unit. If either of the encryption routines encounters an error, throwing (S250) and announcing (S255) an appropriate error message is performed. Otherwise, writing (S260) the second ciphertext data unit into an output file precedes reading the next input data unit (S220) for enciphering. FIG. 3 is a JAVA® code counterpart to the logic flow in FIG. 2.

Figure 4:
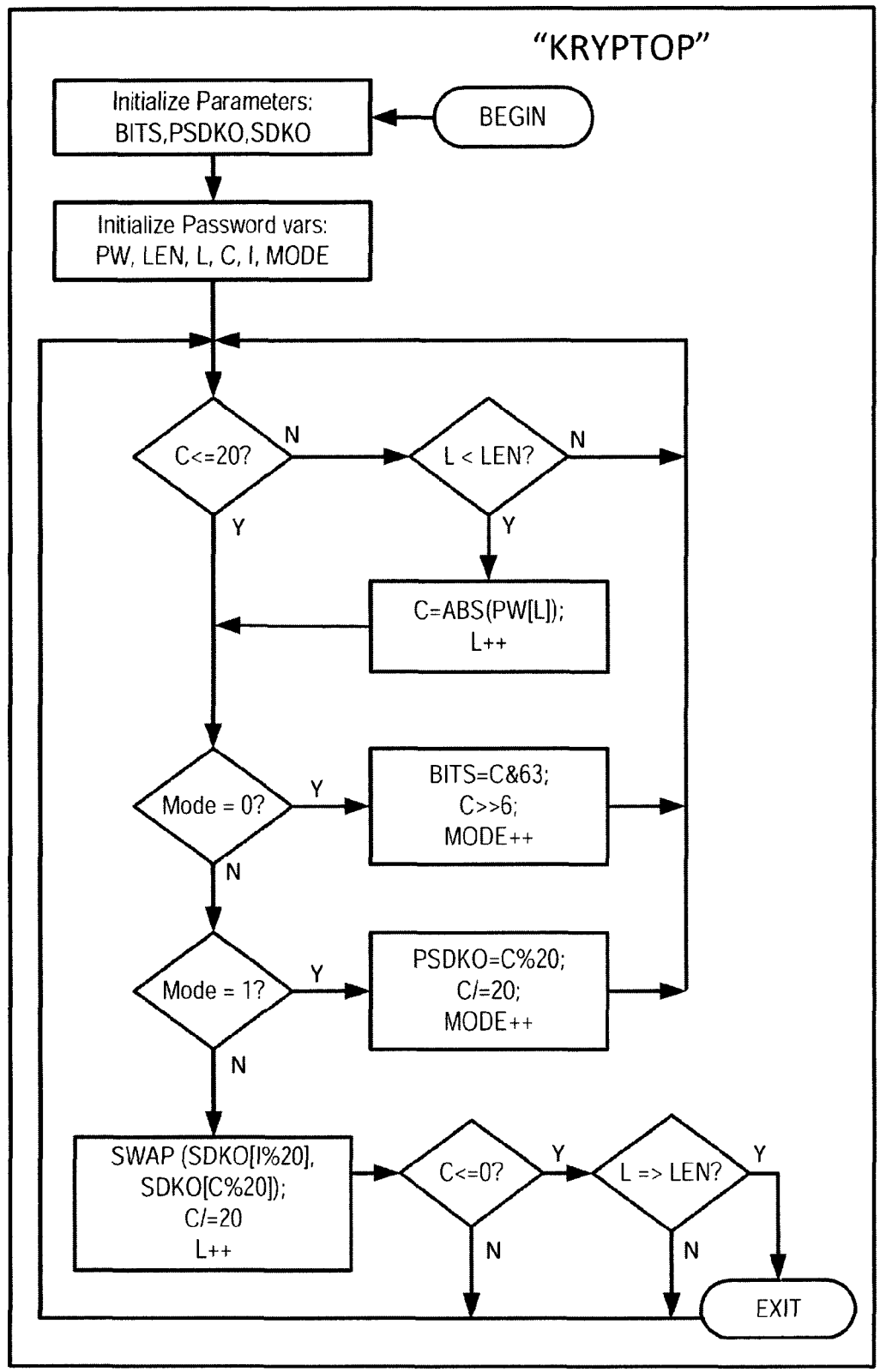
FIG. 4 is a logic flow diagram of a second program algorithm used with the first program algorithm, in accordance with the teachings of the invention herein in accordance with the teachings of the invention herein.

FIGS. 4 and 5 illustrate general flow diagram of the password-integrating ciphering scheme, for convenience, identified as "KRYPTOP" is described, respectively, using a logic flow and the JAVA® programming language for clarity as may be executed on cipher device 110. "KRYPTOP" can be described as a password integration operation. In FIGS. 4 and 5, it is assumed for the sake of exposition that the password (pw) to be used has a length (len) 20 characters (c), and that the process of FIGS. 2 and 3 continues until all password characters have been encrypted (l=>len). Two pointers may be used to make a transposition of numbers in sudoku 60. One pointer may be identified as "sdko," and another may be identified a "psdko."

First, values in register 20 are shuffled by sudoku 60 selecting a corresponding constant of 10 different constants from the unique random constants from of 1 to 63. Each of the random values can augment the values in the input register 20. Finally, the input register 20 is ANDed to fit into 6 bits.

Sudoku 60 may be shuffled by the input register 20. Prime number 7 can be added to sudoku (60) pointer, pskdo, added to it and is then modulated, by 20, to point to a new element in the sudoku 60. This suboperation [((psdko+=7)%20)] can be repeated, as desired. The number 7 is used because the number 6, the number of elements in the bit register 20, is not prime and because the number 6 is evenly divisible by 2 and 3. Also, the number 20, the number of elements in the sudoku 60, is evenly divisible by 2 and 5. It can be seen, then, that a prime number, such as 7, can be used to avoid repetitive numerical symmetries.

The sudoku (60) accesses the input register 20 as scrambled by the pointers. The output from the filter array (60) is passed to the data inputs of at least one data selector or multiplexer (90). The multiplexer (90) has its selector inputs provided from the remaining bits from the input register 20 as scrambled by index. The output from the multiplexer (90) is the cipher output (100). The output from the multiplexer (90) is the cipher bit (100) to be combined (exclusive or) with the plain text to become the cipher text. The cipher text is then transmitted. When received at the other end, the cipher text is combined (exclusive or) with an identically generated cipher bit (100) to become the plain text once again.

Figure 6:
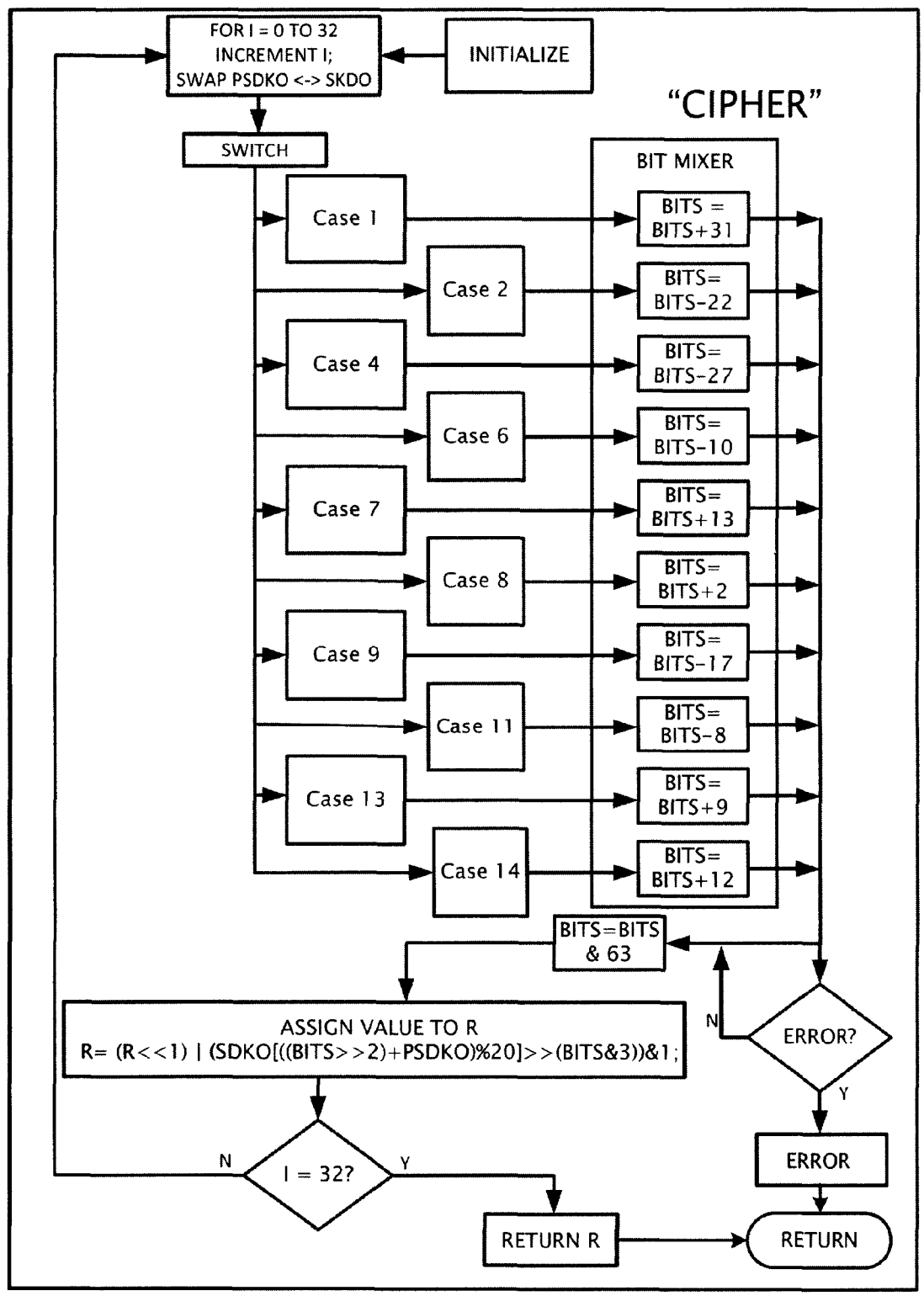
FIG. 6 is a logic flow diagram of a third program algorithm used with the first program algorithm, in accordance with the teachings of the invention herein in accordance with the teachings of the invention herein.

FIGS. 6 and 7 illustrate general flow diagram of the password-integrating ciphering scheme, for convenience, identified as "CIPHER" is described, respectively, using a logic flow and the JAVA® programming language for clarity as may be executed on cipher device 110. "CIPHER" may be described as a pseudorandom number generator operation, which may be used to encipher plaintext or to decipher ciphertext. Variables SDKO and PDSKO may be transposed and then operation turns over to the cases of a SWITCH statement. Each case statement embodies one of the 10-of-16 filtering functions of the sudoku 60. Each of the bits statement for a corresponding switch case is generally associated with a selectable mixing value. The values selected for mixing values can be important in that one difference in a mixing value can result in a completely different cipher. So, symmetry of mixing values may be used to produce a reversible cipher—a ciphertext message mixed with the same mixing values as those used to encipher the corresponding plaintext can produce the deciphered plaintext. A change in any of the value, the polarity, the evenness or the position in the mixing values may produce a ciphertext that does not match the corresponding plaintext, and the ciphertext used with different mixing values can end up with a nonsensical plaintext output.

In one embodiment shown in FIGS. 6 and 7, positive and negative values of numbers between 1 and 31 were selected, drawing an equal number of positive and negative numbers around a mode of the numbers. Such sign, symmetry, modality, and selection are for example only and other embodiments of the present invention are not so restricted, for example, in a general case. It may be possible to have the mixing values assigned in advance of an enciphering or a deciphering transaction, for example, by a content distributor over the Internet to a playback device, which may include cipher device 110, although such device is not mandatory to practice the method described herein. In any case, once the mixing values are selected, elements of a password, such as a character, may be encrypted into a ciphertext message, which serves, for example, as a decryption key.

Figure 8:
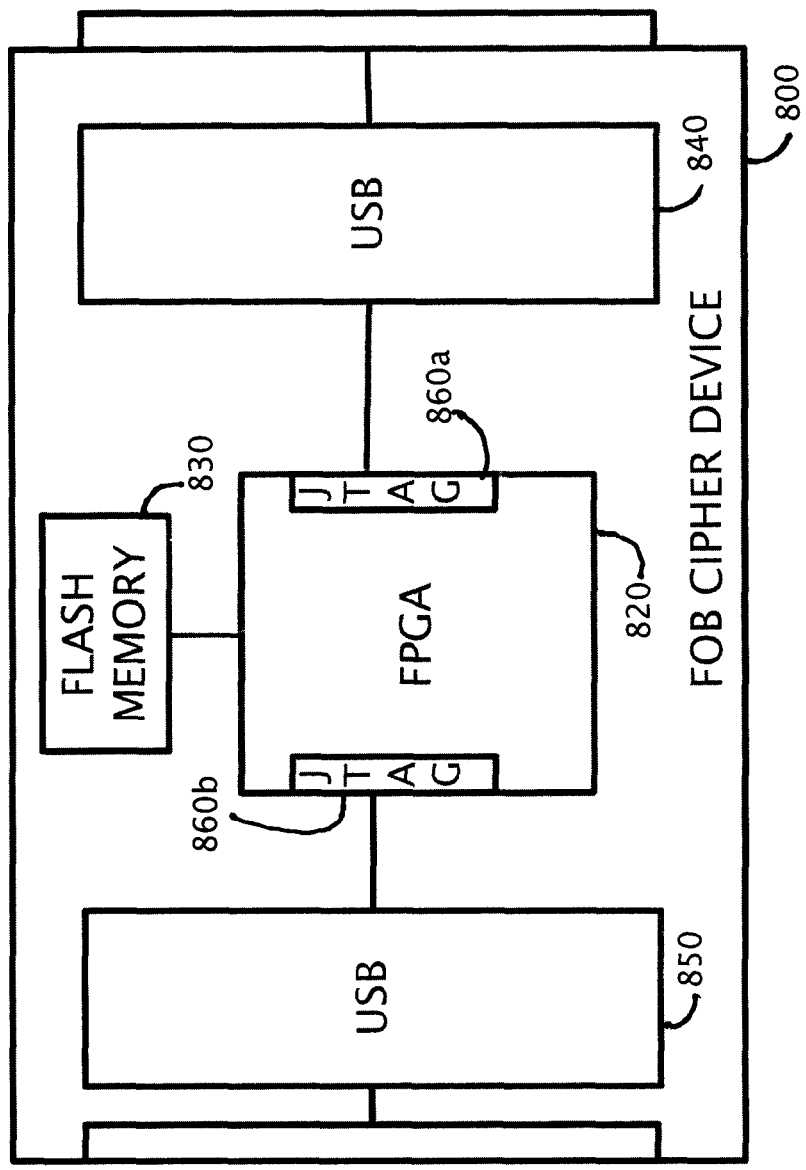
FIG. 8 is a block logic diagram of a fob-type cipher device, in accordance with the teachings of the invention herein.

In another embodiment, shown in FIG. 8, a cipher device, such as cipher device 110 can be implemented in a fob-like cipher device 810 containing an FPGA 820 and flash memory 830. An example embodiment of cipher device can be configured to have a first USB port 840 and a second USB port 850, and include JTAG header support 860a, b, to the USB ports 840,850. FPGA 820 can be programmed to execute code, for example, in accordance with the operations illustrated by FIGS. 2-7.

While the invention has been described in terms of various specific embodiments, those skilled in the art will recognize that the invention can be practiced with modification within the spirit and scope of the claims.

The invention claimed is:

1. A method of securing data, comprising:
receiving a plaintext data unit;
encrypting 4 bits of a plaintext data unit with a transposed Sudoku to form a first ciphertext unit, wherein the first ciphertext unit comprises one of ten preselected bit combinations;
encrypting the first ciphertext unit with pseudorandom mixing bits different from the Sudoku to form a second ciphertext unit, wherein the pseudorandom mixing bits are produced using a multiplexer, wherein the multiplexer is a 1 of 4 multiplexer and wherein encrypting the first ciphertext unit with pseudorandom mixing bits includes combining the pseudorandom mixing bits with the first ciphertext unit using an exclusive OR function to produce the second ciphertext unit; and
outputting the second ciphertext unit corresponding to the plaintext data unit.

2. The method of claim 1 wherein encrypting a plaintext data unit with the transposed Sudoku and encrypting the first ciphertext unit with pseudorandom mixing bits are done using a hardware language for encryption.

3. The method of claim 1 wherein encrypting a plaintext data unit with the transposed Sudoku and encrypting the first ciphertext unit with pseudorandom mixing bits are done using a stream-based cipher protocol.

4. The method of claim 1 further comprising integrating a password, which may be used to encrypt and decrypt the plaintext data unit at a source and a destination using a predetermined mixing value set.

5. The method of claim 1 wherein the transposed Sudoku is configured to exclude complementary values that may cause ignore states when encrypting the 4 bits of the plaintext data unit with the transposed Sudoku to form the first ciphertext unit.

6. A cipher device, comprising:
an input port;
a FPGA coupled with the input port, and configured using an HDL to perform encrypting 4 bits of a plaintext data unit with a transposed Sudoku to form a first ciphertext unit, wherein the first ciphertext unit comprises one of ten preselected bit combinations, and encrypting the first ciphertext unit with pseudorandom mixing bits different from the Sudoku to form a second ciphertext unit; and
an output port coupled with the FPGA;
wherein the cipher device is configured to produce the pseudorandom mixing bits using a multiplexer, wherein the multiplexer is a 1 of 4 multiplexer and wherein encrypting the first ciphertext unit with pseudorandom mixing bits includes combining the pseudorandom mixing bits with the first ciphertext unit using an exclusive OR function to produce the second ciphertext unit,
wherein the FPGA, the input port, and the output port are configured as a FOB device, and wherein the plaintext is received at an input port and a corresponding second ciphertext unit is transmitted to the output port.

7. The cipher device of claim 6, further comprising: a memory device coupled with the FPGA.

8. The cipher device of claim 6 where the input port is a USB port and the output port is a USB port.

9. The cipher device of claim 6 further comprising a Sudoku filter in direct communication with 4 bits of an input register and a multiplexer in direct communication with 2 different bit inputs, which do not first pass through the Sudoku filter.

10. The cipher device of claim 9 wherein the Sudoku filter is configured to shuffle or filter data received from the 4 bit inputs into 10 preselected bit combinations.

* * * * *